(12) United States Patent
Shavit et al.

(10) Patent No.: US 7,159,215 B2
(45) Date of Patent: Jan. 2, 2007

(54) TERMINATION DETECTION FOR SHARED-MEMORY PARALLEL PROGRAMS

(75) Inventors: Nir N. Shavit, Cambridge, MA (US);
Xiaolan Zhang, Ossining, NY (US);
Christine H. Flood, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 721 days.

(21) Appl. No.: 09/893,264

(22) Filed: Jun. 27, 2001

(65) Prior Publication Data

US 2003/0005029 A1 Jan. 2, 2003

(51) Int. Cl.
*G06F 9/46* (2006.01)

(52) U.S. Cl. .................. 718/100; 718/102

(58) Field of Classification Search .......... 718/1, 718/100–108
See application file for complete search history.

(56) References Cited

U.S. PATENT DOCUMENTS 6,434,590 B1 * 8/2002 Blelloch et al. ............ 718/102

2001/0025295 A1 * 9/2001 Kawachiya et al. ........ 709/106

OTHER PUBLICATIONS

Leslie Lamport, Providing the Correctness of Multiprocess Programs, IEEE Transaction on Software Engineering, vol. SE-3, No. 2, Mar. 1977, pp. 125-143.

* cited by examiner

*Primary Examiner*—Meng-Al T. An
*Assistant Examiner*—Kenneth Tang
(74) *Attorney, Agent, or Firm*—Osha Liang LLP

(57) ABSTRACT

A "garbage collector" employed to reclaim memory dynamically allocated to data objects employs multiple execution threads to perform a parallel-execution operation and its garbage-collection cycle. A thread executes tasks that it selects from lists whose entries represent tasks dynamically identified during other tasks' performance. When a thread fails to find a task in one of these lists, it sets to an inactivity-indicating value a field associated with it in a global status word. It also determines whether any field associated with any of the other threads indicates activity. If not, the thread concludes that the parallel-execution operation has been completed. Otherwise, it returns to searching for further tasks to perform.

43 Claims, 9 Drawing Sheets

```
1    java_lang_Object* popTop ()
2    {
3        oldAge = age;
4        localBot = bot;
5        if (localBot <= oldAge.top)
6            return NULL;
7        task = deq[oldAge.top];
8        newAge = oldAge;
9        newAge.top++;
10       cas(age, oldAge, newAge); /*atomic compare-and-swap*/
11       if(oldAge == newAge)
12           return task;
13       return NULL;
14   }
```

FIG. 7

```
1    void pushBottom(java_lang_Object* task)
2    {
3        localBot = bot;
4        deq[localBot] = task;
5        localBot++;
6        bot = localBot;
7    }
```

FIG. 8

```
1    java_lang_Object* popBottom()
2    {
3        localBot = bot;
4        if (localBot == 0)
5          return NULL;
6        localBot--;
7        bot = localBot;
8        task = deq[localBot];
9        oldAge = age;
10       if (localBot > oldAge.top)
11         return task;
12       bot = 0;
13       newAge.top = 0;
14       newAge.tag = oldAge.tag + 1;
15       if (localBot == oldAge.top) {
16         cas(age, oldAge, newAge)
17         if (oldAge == newAge)
18           return task;
19       }
20       age = newAge;
21       return NULL;
22   }
```

```
1   java_lang_Object *dequeFindWork(localDeque *dq) {
2       java_lang_Object *result = findWorkHelper(dq);
3       globalDeques *gdqs = dq->gdeques;
4       if (result == NULL) {
5           mark_self_inactive(dq->index, &gdqs->statusBitmap); /* You have no work */
6       }
7       while (result == NULL) {
8           if (!gdqs->statusBitmap) return NULL; /* No one has any work. Terminate. */
9           poll(NULL, NULL, 0);
10          if (checkForWork(dq)) { /* You don't have any work, but there is some either
11                      on the overflow queue, or in another thread's work
12                      queue */
13              mark_self_active(dq->index, &gdqs->statusBitmap); /* Looking for work */
14              result = findWorkHelper(dq);
15              if (result == NULL) {
16                  mark_self_inactive(dq->index, &gdqs->statusBitmap);
17              }
18          }
19      }
20      return result;
21  }
```

```
1   Java_lang_Object *findWorkHelper(localDeque *dq) {
2       java_lang_Object *task = findWorkInOverflowList(dq);
3       if (task == NULL) {
4           task = stealWork(dq);
5       }
6       return task;
7   }
```

FIG. 11

```
1   static java_lang_Object *stealWork(localDeque *dq) {
2       globalDeques *gdqs = dq->gdeques;
3       int degree = gdqs->numDeques;
4       int iterations = 2 * degree;
5       int i = 0;
6       while (i++ < iterations) {
7           localDeque *dqToSteal = pickQueueToStealFrom(gdqs, dq);
8           if (dqToSteal->bot > dqToSteal->age.top) {
9               java_lang_Object *task = (java_lang_Object *)popTop(dqToSteal);
10              if(!task) poll(NULL, NULL, 0);
11              else return task;
12          }
13      }
14      return NULL;
15  }
```

FIG. 12

```
1   static bool_t checkForWork(localDeque *dq) {
2       globalDeques *gdqs = dq->gdeques;
3       return gdqs->classesWithWork || peekDeque(dq);
4   }

1   static bool_t peekDeque(localDeque *dq) {
2       globalDeques *gdqs = dq->gdeques;
3       int degree = gdqs->numDeques;
4       int i;
5       for (i = 0; i < 2 * degree; i++) {
6           localDeque *dqToPeek = pickQueueToStealFrom(gdqs, dq);
7           if (dqToPeek->bot > dqToPeek->age.top) {
8               return TRUE;
9           }
10      }
11      return FALSE;
12  }
```

FIG. 13

TERMINATION DETECTION FOR SHARED-MEMORY PARALLEL PROGRAMS

CROSS-REFERENCE TO RELATED APPLICATIONS

This application is related to commonly assigned U.S. patent applications of Nir N. Shavit et al. for Globally Distributed Load Balancing, assigned Ser. No. 09/892,813 and Load-Balancing Queues Employing LIFO/FIFO Work Stealing, assigned Ser. No. 09/893,256, both of which were filed on the same date as this application and are hereby incorporated by reference.

BACKGROUND OF THE INVENTION

1. Field of the Invention

The present invention is directed to parallel execution in computer processes. It particularly concerns the manner in which different execution threads terminate their work on parallel operations.

2. Background Information

Modern computer systems provide for various types of concurrent operation. A user of a typical desktop computer, for instance, may be simultaneously employing a word-processor program and an e-mail program together with a calculator program. The user's computer could be using several simultaneously operating processors, each of which could be operating on a different program. More typically, the computer employs only a single main processor, and its operating-system software causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating-system software typically have special provisions for performing such context switches.

A program running as a computer-system process may take advantage of such provisions to provide separate, concurrent "threads" of its own execution. In such a case, the program counter and various register contents are stored and reloaded with a different thread's value, as in the case of a process change, but the memory-mapping values are not changed, so the new thread of execution has access to the same process-specific physical memory as the same process's previous thread.

In some cases, the use of multiple execution threads is merely a matter of programming convenience. For example, compilers for various programming languages, such as the Java programming language, readily provide the "housekeeping" for spawning different threads, so the programmer is not burdened with handling the details of making different threads' execution appear simultaneous. In the case of multiprocessor systems, though, the use of multiple threads has speed advantages. A process can be performed more quickly if the system allocates different threads to different processors when processor capacity is available.

To take advantage of this fact, programmers often identify constituent operations with their programs that particularly lend themselves to parallel execution. When program execution reaches a point where the parallel-execution operation can begin, it starts different execution threads to perform different tasks within that operation.

Now, in some parallel-execution operations the tasks to be performed can be identified only dynamically; that is, some of the tasks can be identified only by performing others of the tasks, so the tasks cannot be divided among the threads optimally at the beginning of the parallel-execution operation. Such parallel-execution operations can occur, for instance, in what has come to be called "garbage collection," which is the automatic reclamation of dynamically allocated memory. Byte code executed by a Java virtual machine, for instance, often calls for memory to be allocated for data "objects" if certain program branches are taken. Subsequently, a point in the byte-code program's execution can be reached at which there is no further possibility that the data stored in that dynamically allocated memory will be used. Without requiring the programmer to provide specific instructions to do so, the virtual machine executing the byte code automatically identifies such "unreachable" objects and reclaims their memory so that objects allocated thereafter can use it.

The general approach employed by the virtual machine's garbage collector is to identify all objects that are reachable and then reclaim memory that no such reachable object occupies. An object is considered reachable if it is referred to by a reference in a "root set" of locations, such as global variables, registers, or the call stack, that are recognized as being inherently reachable. An object is also reachable if it is referred to by a reference in a reachable object.

So reachable-object identification is a recursive process: the identification of a reachable object can lead to identification of further reachable objects. And, if every reachable object so far identified is thought of as representing a further task, namely, that of identifying any further objects to which it refers, it can be seen that parts of the garbage-collection process include tasks that are only dynamically identifiable. If those tasks are properly programmed, they can be performed in an essentially parallel manner. Specifically, the initial, statically identifiable members of the root set can be divided among a plurality of threads (whose execution will typically be divided among many processors), and those threads can identify reachable objects in parallel.

Now, a point may be reached at which every remaining identified reachable object has already been claimed by a thread for processing. In such a situation, it may initially appear desirable for other threads to proceed to the next operation: all of the parallel-execution operation's tasks have been completed. But allowing them to do so could result in highly suboptimal performance. Since reachable-object identification occurs dynamically, the threads still performing tasks of the parallel-execution operation could end up identifying a large number of further tasks, and they would be left to perform those tasks alone. So it is important to be able to detect the fact that a parallel-execution operation may not be completed, even when none of its tasks is currently available for a thread to perform.

SUMMARY OF THE INVENTION

We have developed an advantageous way of detecting such possibilities and confirming that all of a parallel-execution operation's tasks have been completed even though they can be identified only dynamically. Our approach involves the use of what we call a "global status word." The global status word includes a field for each the threads involved in performing a parallel-execution operation, and each field indicates whether its associated thread is active or inactive. So long as a thread is finding tasks of the parallel-execution operation and performing them, its field in the global status word contains the activity-representing value.

When a thread reaches a point at which it is unsuccessful in finding any further tasks to perform, it resets its field in the global status word to the inactivity-representing value and checks whether any of the other fields has the activity-representing value. If any does, it repeatedly searches for tasks and checks the global status word to determine whether activity-representing values are in any of its fields. So long as the global status word includes any field whose contents represent activity, it concludes that further dynamically identified tasks may need to be performed, and it continues searching for tasks and checking the global status word. If it finds a task, it sets its associated field in the global status word to the activity-representing value and then attempts to claim a task. If it is successful in claiming a task, it performs that task and again searches for further work. If it is unable to claim the task, it resets its global-status-word field to the inactivity-representing value and returns to searching for tasks and checking the global status word.

When the point is reached at which none of the global status word's fields contains an activity-representing value, then the thread concludes that no further tasks remain in the parallel-execution operation, and it can proceed to further program steps.

BRIEF DESCRIPTION OF THE DRAWINGS

The invention description below refers to the accompanying drawings, of which:

FIG. 7 is a listing of a routine for popping entries from the top of a double-ended queue;

FIG. 8 is a listing of a routine for pushing entries onto the bottom of a double-ending queue;

FIG. 11 contains listings of routines employed by the illustrated embodiment to locate tasks when its associated task queue is empty;

FIG. 12 is a listing of a routine that a thread in the illustrated embodiment employs to "steal" work from other threads' work queues; and FIG. 13 contains listings for routines that a thread in the illustrated embodiment employs to determine whether tasks are listed in overflow lists or other threads' work queues.

DETAILED DESCRIPTION OF AN ILLUSTRATIVE EMBODIMENT

Figure 1:
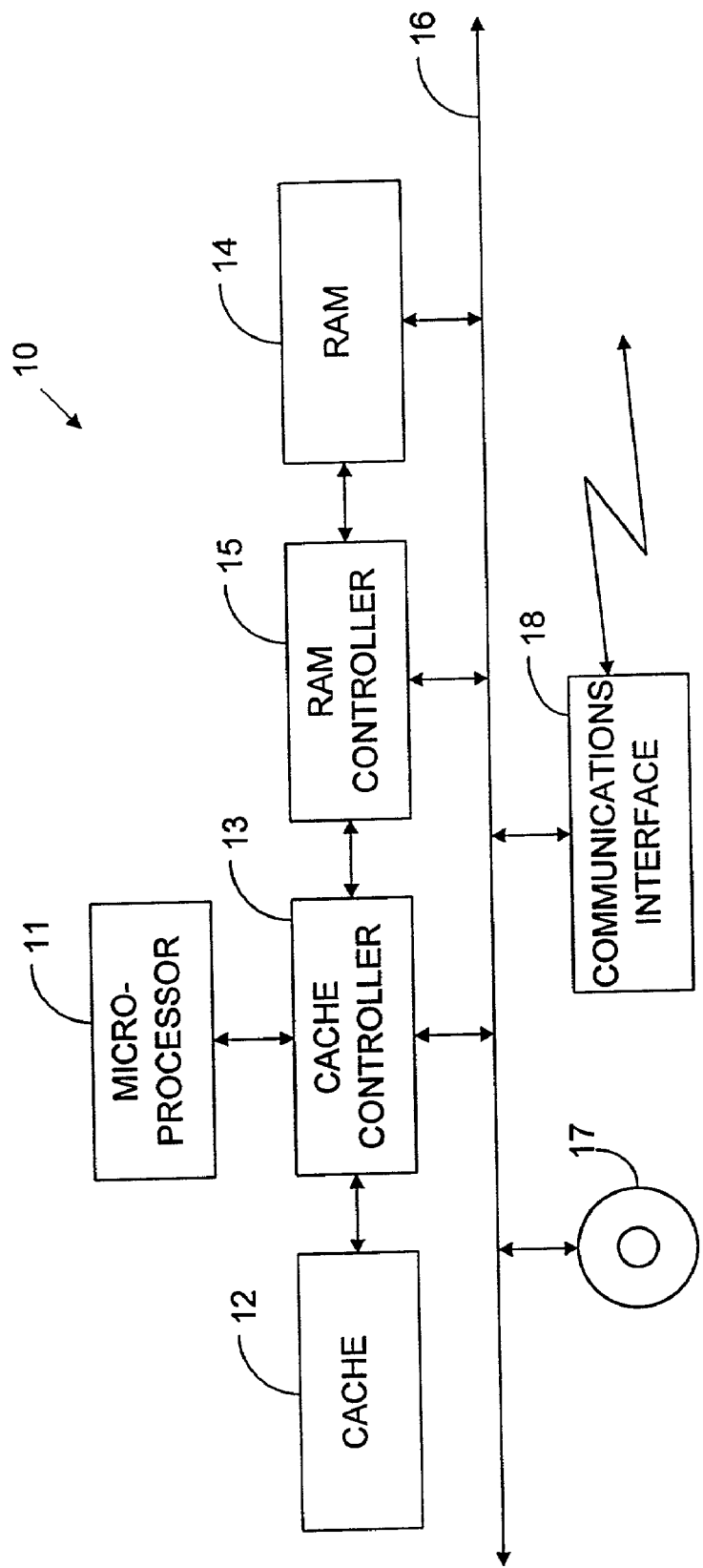
FIG. 1 is a block diagram of a typical uniprocessor computer system.

The present invention's teachings concerning termination of a parallel-execution operation can be implemented in a wide variety of systems. Some of the benefits of employing multiple threads can be obtained in uniprocessor systems, of which FIG. 1 depicts a typical configuration. Its uniprocessor system 10 employs a single microprocessor such as microprocessor 11. In FIG. 1's exemplary system, microprocessor 11 receives data, and instructions for operating on them, from on-board cache memory or further cache memory 12, possibly through the mediation of a cache controller 13. The cache controller 13 can in turn receive such data from system read/write memory ("RAM") 14 through a RAM controller 15, or from various peripheral devices through a system bus 16.

The RAM 14's data and instruction contents, which can configure the system to implement the teachings to be described below, will ordinarily have been loaded from peripheral devices such as a system disk 17. Other sources include communications interface 18, which can receive instructions and data from other computer equipment.

Although threads generally, and therefore the present invention's teachings in particular, can be employed in such systems, the application in connection with which the present invention is described by way of example would more frequently be implemented in a multiprocessor system. Such systems come in a wide variety of configurations. Some may be largely the same as that of FIG. 1, with the exception that they could include more than one microprocessor such as processor 11, possibly together with respective cache memories, sharing common read/write memory by communication over the common bus 16.

Figure 2:
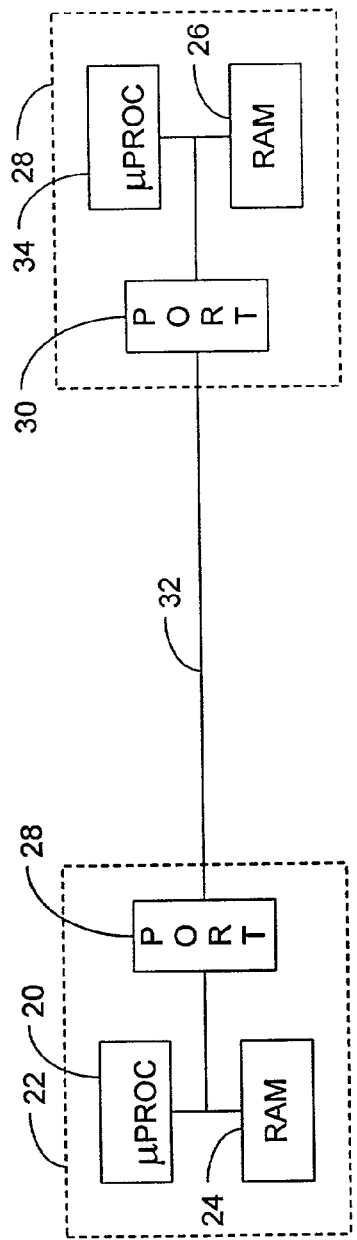
FIG. 2 is a block diagram of one type of multiprocessor computer system.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 28 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places. Regardless of the configuration, different processors can operate on the same code, although that code may be replicated in different physical memory, so different processors can be used to execute different threads of the same process.

To illustrate the invention, we will describe its use for properly terminating a parallel-execution operation performed by a garbage collector. To place garbage collection in context, we briefly review the general relationship between programming and computer operation. When a processor executes a computer program, of course, it executes machine instructions. A programmer typically writes the program, but it is a rare programmer who is familiar with the specific machine instructions in which his efforts eventually result. More typically, the programmer writes higher-level-language "source code," from which a computer software-configured to do so generates those machine instructions, or "object code."

Figure 3:
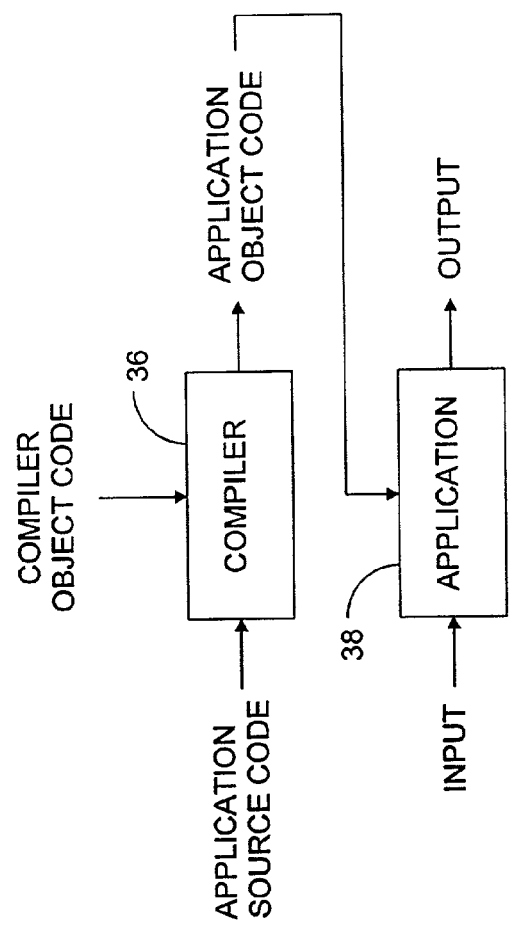
FIG. 3 is a block diagram that illustrates a relationship between source code and object code.

FIG. 3 represents this sequence. FIG. 3's block 36 represents a compiler process that a computer performs under the direction of compiler object code. That object code is typically stored on a persistent machine-readable medium, such as FIG. 1's system disk 17, and it is loaded by transmission of electrical signals into RAM 14 to configure the computer system to act as a compiler. But the compiler object code's persistent storage may instead be provided in a server system remote from the machine that performs the compiling. The electrical signals that carry the digital data by which the computer systems exchange the code are exemplary forms of carrier waves transporting the information.

In any event, the compiler converts source code into application object code, as FIG. 3 indicates, and places it in machine-readable storage such as RAM 14 or disk 17. A computer will follow that object code's instructions in performing the thus-defined application 38, which typically generates output from input. The compiler 36 can itself be thought of as an application, one in which the input is source code and the output is object code, but the computer that executes the application 28 is not necessarily the same as the one that executes the compiler application 36.

The source code need not have been written by a human programmer directly. Integrated development environments often automate the source-code-writing process to the extent that for many applications very little of the source code is produced "manually."

As will be explained below, moreover, the "source" code being compiled may sometimes be low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) And, although FIG. 3 may appear to suggest a batch process, in which all of an application's object code is produced before any of it is executed, the same processor may both compile and execute the code, in which case the processor may execute its compiler application concurrently with—and, indeed, in a way that can depend upon—its execution of the compiler's output object code.

So the sequence of operations by which source code results in machine-language instructions may be considerably more complicated than one may infer from FIG. 3. To give a sense of the complexity that can be involved, we discuss by reference to FIG. 4 an example of one way in which various levels of source code can result in the machine instructions that the processor executes. The human application programmer produces source code 40 written in a high-level language such as the Java programming language. In the case of the Java programming language, a compiler 42 converts that code into "class files." These predominantly include routines written in instructions, called "byte code" 44, for a "virtual machine" that various processors can be programmed to emulate. This conversion into byte code is almost always separated in time from that code's execution, so that aspect of the sequence is depicted as occurring in a "compile-time environment" 46 separate from a "run-time environment" 48, in which execution occurs.

Figure 4:
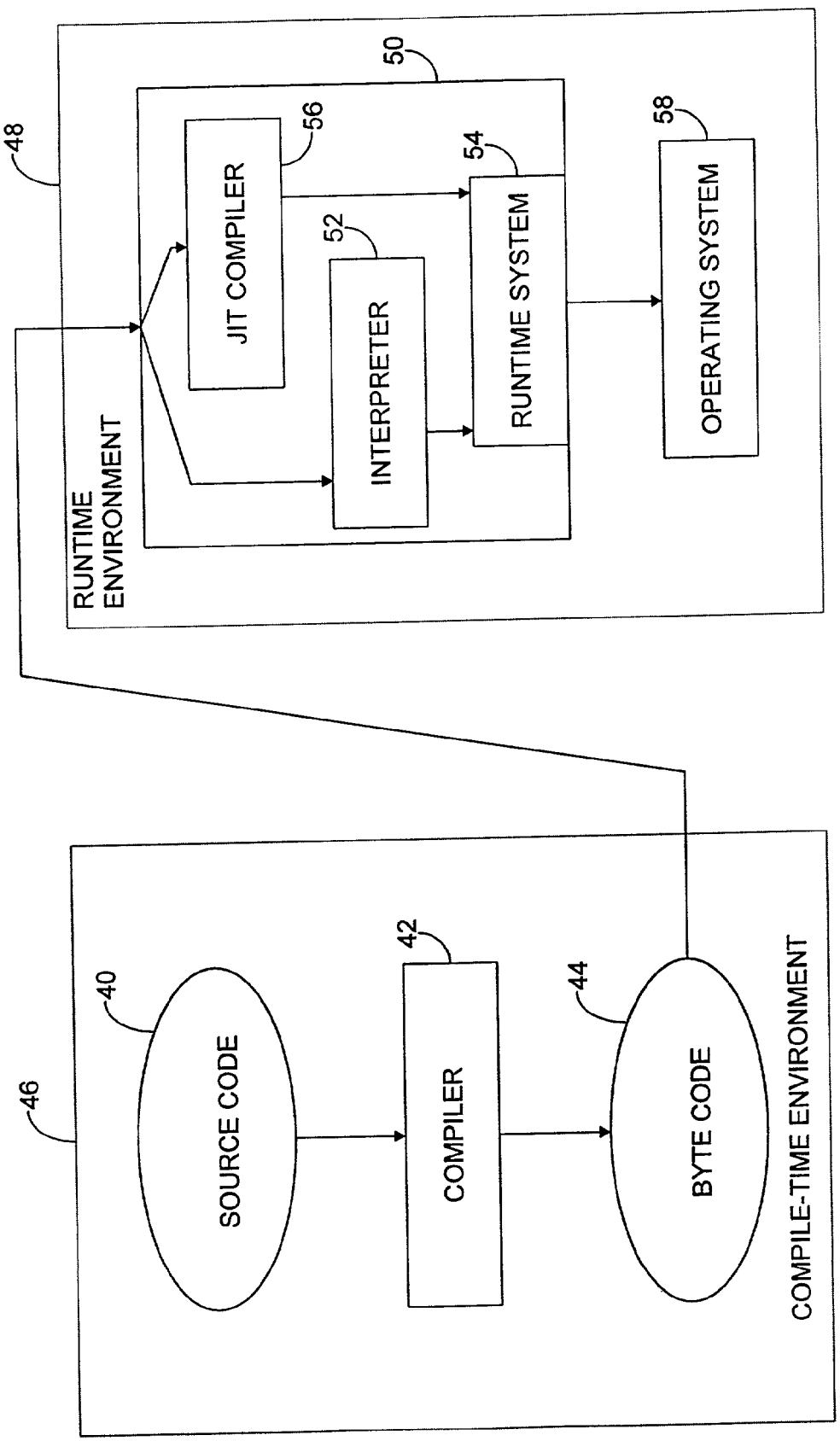
FIG. 4 is a block diagram of a more-complicated relationship between source code and object code.

Most typically, a processor runs the class files' instructions under the control of a virtual-machine program 50, whose purpose is to emulate a machine from whose instruction set the byte codes are drawn. Much of the virtual machine's action in executing the byte code is most like what those skilled in the art refer to as "interpreting," and FIG. 4 shows that the virtual machine includes an "interpreter" 52 for that purpose. The resultant instructions typically involve calls to a run-time system 54, which handles matters such as loading new class files as they are needed.

Many virtual-machine implementations also actually compile the byte code concurrently with the resultant object code's execution, so FIG. 4 depicts the virtual machine as additionally including a "just-in-time" compiler 56. It may be that the resultant object code will make low-level calls to the run-time system, as the drawing indicates. In any event, the code's execution will include calls to the local operating system 58.

In addition to class-file loading, one of the functions that the runtime system performs is the garbage collection. The programming that performs this function can include parallel-execution operations, and it is by reference to such operations that we will illustrate the present invention's approach to termination detection. To aid that discussion, we digress to a brief review of garbage-collection nomenclature.

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object may belong to a class, which is an organizational entity that may contain method code or other information shared by all objects belonging to that class. The specific example below by which we illustrate the present invention's more-general applicability deals with reclaiming memory allocated to Java-language objects, which belong to such classes.

A modem program executing as a computer-system process often dynamically allocates storage for objects within a part of the process's memory commonly referred to as the "heap." As was mentioned above, a garbage collector reclaims such objects when they are no longer reachable.

To distinguish the part of the program that does "useful" work from that which does the garbage collection, the term mutator is sometimes used; from the collector's point of view, what the mutator does is mutate active data structures' connectivity. Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object allocation includes steps for finding space occupied by objects whose reference count has fallen to zero. Obviously, such an approach can slow mutator operation significantly.

Other, "stop-the-world" garbage-collection approaches use somewhat less interleaving. The mutator still typically allocates an object space within the heap by invoking the garbage collector, which keeps track of the fact that the thus-allocated region is occupied and refrains from allocating that region to other objects until it determines that the mutator no longer needs access to that object. But a stop-the-world collector performs its memory reclamation during garbage-collection cycles separate from the cycles in which the mutator runs. That is, the collector interrupts the mutator process, finds unreachable objects, reclaims their memory space for reuse, and then restarts the mutator.

Figure 5:
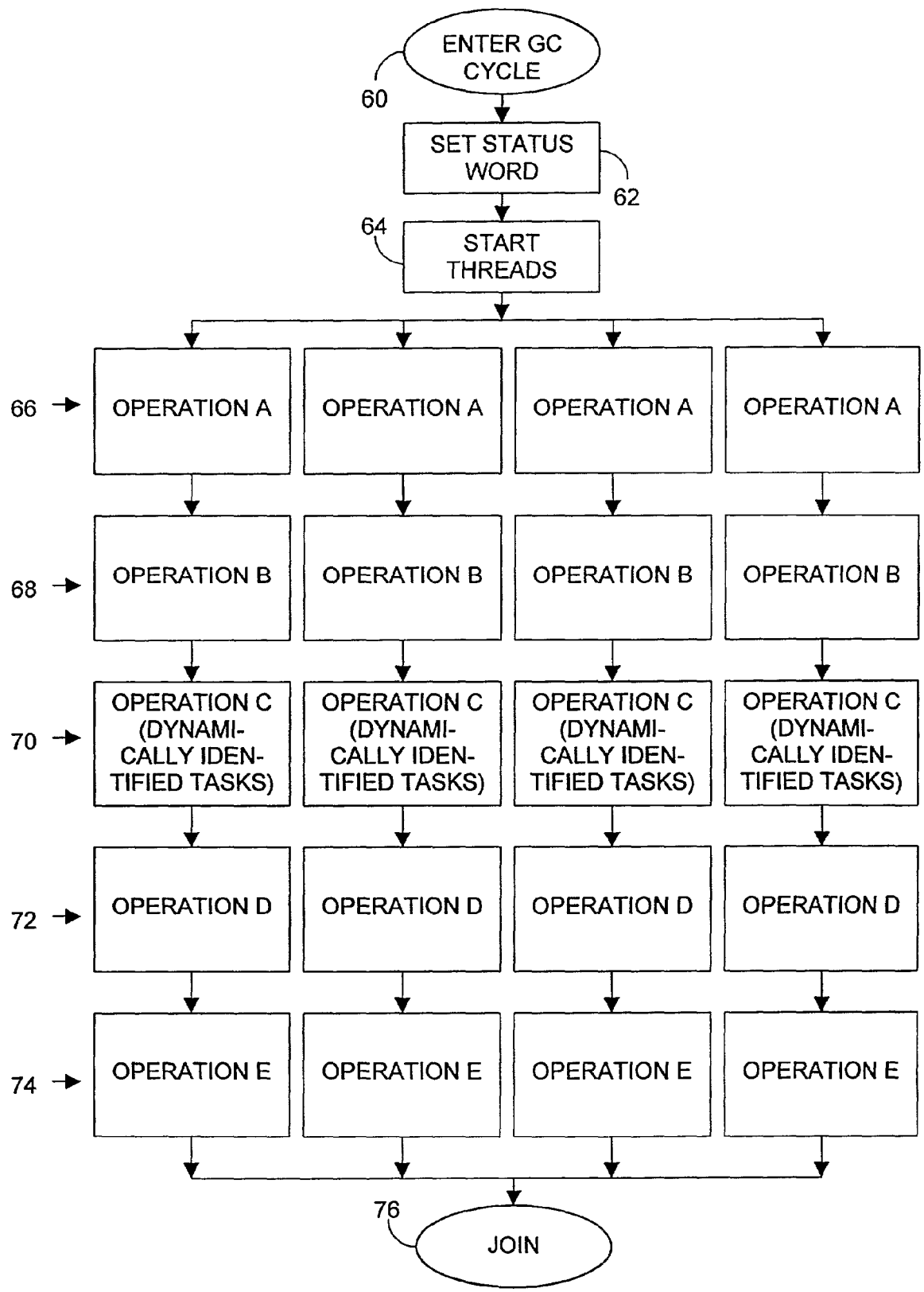
FIG. 5 is a flow chart that illustrates a sequence of parallel-execution operations.

To provide an example of a way in which the present invention's teachings can be applied, we assume a "stop-the-world" garbage collector and focus on the garbage-collection cycle. Since most of the specifics of a garbage-collection cycle are not of particular interest in the present context, FIG. 5 depicts only part of the cycle, and it depicts that part in a highly abstract manner. Its block 60 represents the start of the garbage-collection cycle, and its block 62 represents one of a number of the initial garbage-collection steps that are performed by a single thread only.

Eventually, the garbage collector reaches a part of its routine that can benefit from multi-threaded execution, and the virtual-machine programming calls upon the operating system to start a number of threads, as block 64 indicates, that will execute a subsequent code sequence in parallel. For the sake of example, we assume four threads. This would typically mean that the garbage collector is running in a multiprocessor system of at least that many processors, since the advantages of multithreading in an automatic-garbage-collection context are principally that different processors will at least sometimes execute different threads simultaneously.

Each of the threads executes an identical code sequence. The drawing depicts the code sequence somewhat arbitrarily as divided into a number of operations A, B, C, D, and E respectively represented by blocks 66, 68, 70, 72, and 74. These operations' specifics are not germane to the present discussion, but commonly assigned U.S. patent application Ser. No. 09/377,349, filed on Aug. 19, 1999, by Alexander T. Garthwaite for Popular-Object Handling in a Train-Algorithm-Based Garbage Collector, now U,S. Pat. No. 6,434,576, and hereby incorporated by reference, gives examples of the types of garbage-collection operations that blocks 66, 68, 70, 72 and 74 may include.

Although all threads execute the same code sequence, some of the code's routines take the thread's identity as an argument, and some of the data that an instruction processes may change between that instruction's executions by different threads. These factors, together with hardware differences and the vagaries of thread scheduling, result in different threads' completing different operations at different times even in the absence of the dynamic task identification.

But there is usually some point in the routine beyond which execution should not proceed until all threads have reached it, so a "join" mechanism, represented by block 76, imposes this requirement. It is only after all threads reach the join point that further execution of the garbage-collection cycle can proceed.

The way in which the join mechanism is implemented is not of particular interest in the present discussion except to help explain the present invention's purpose by contrast. Whereas the join mechanism insures that execution proceeds no further until all threads have reached the join point, the present invention's termination mechanism insures that all threads keep working until all of a given operation's work has been done.

Although the present invention's range of applicability is broader, the need for it tends to be more pronounced in operations that involve dynamically identifiable tasks. To illustrate how the need for such a mechanism can arise, let us assume that FIG. 5's operation B involves essentially only statically identifiable tasks, whereas operation C's involve tasks principally identifiable only dynamically. For example, assume that operation B involves processing the root set to find reachable objects. The root set may be divided into groups, and different threads may claim different groups to process. Although the present invention's teachings can be employed to aid in optimal division of this operation's tasks among threads, the fact that the tasks are suitable for performance in accordance with one of the approaches described in commonly assigned U.S. patent application Ser. No. 09/697,729, which was filed by Flood et al. on Oct. 26, 2000, for Work-Stealing Queues for Parallel Garbage Collection, now U.S. Pat. No. 6,823,351, and is hereby incorporated by reference.

By performing those tasks, though, a garbage-collection thread dynamically identifies further tasks to perform. When operation B identifies an object referred to by the root set, that is, it has also identified the task of following the references in the thus-identified object to find further roots. We will assume that operation C involves processing the reachable objects thus identified, so its tasks are identifiable only dynamically: since it is only by performing one of the tasks that further tasks are identified, the tasks are not known at the beginning of the operation. Because of the task-identification process's dynamic nature, operation C would be particularly vulnerable to a work imbalance among the threads in the absence of features such as those of the present invention, whose purpose in this case is to keep all threads working on operation C so long as any operation-C work is left to do.

Figure 6:
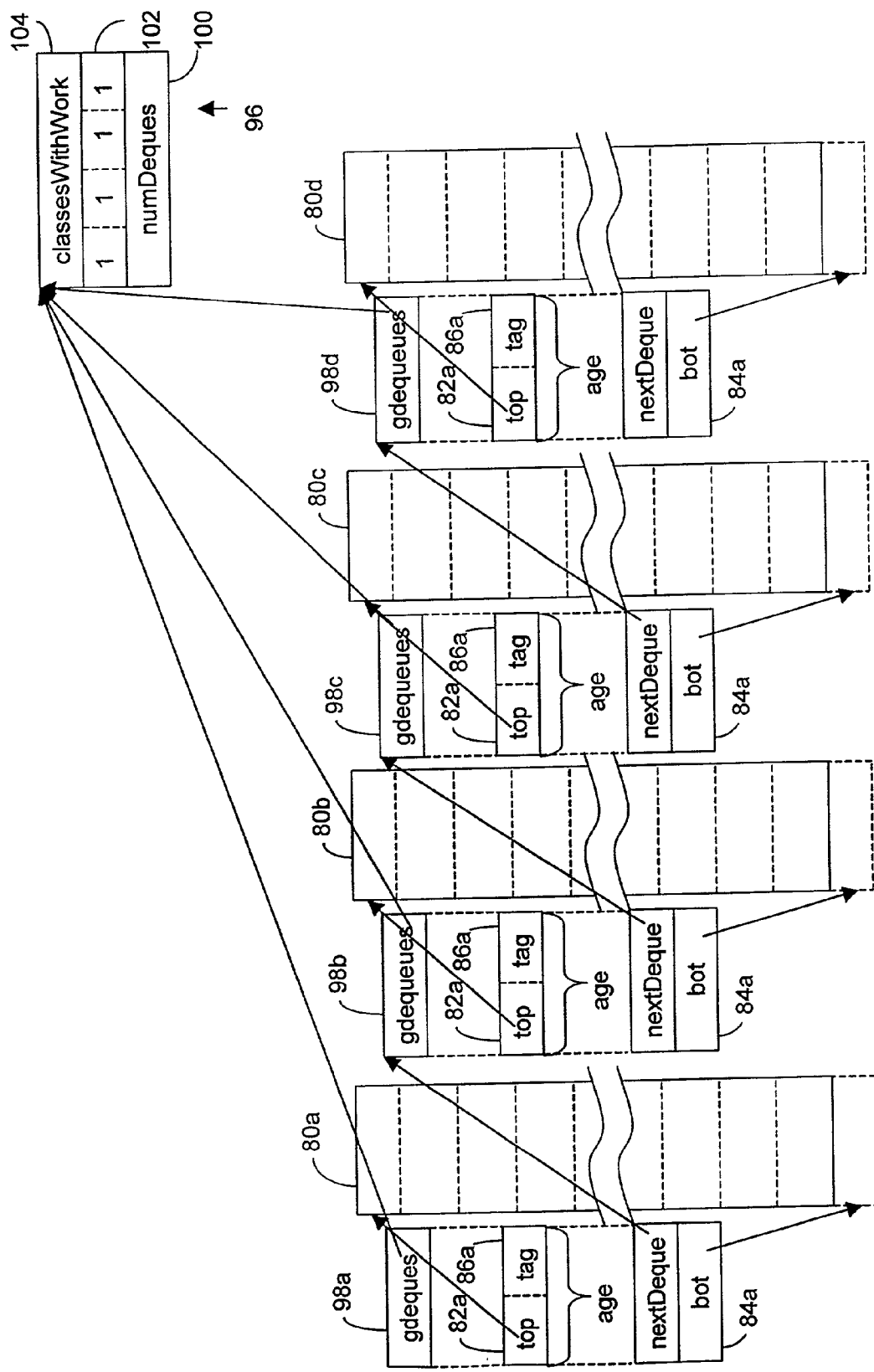
FIG. 6 is a block diagram illustrating work queues that an embodiment of the present invention may employ.

To help illustrate one application of the present invention's termination-detection mechanism, we first employ FIG. 6 to describe operation C, whose termination the present invention can be used to detect. Work queues 80a, b, c, and d are associated with respective threads. When a thread dynamically identifies a task, it places an identifier of that task in its work queue. In the case of operation C, i.e., reachable-object-identification and processing, a convenient type of task identifier to place in the work queue is an identifier of the reachable object that the garbage-collection thread has found. (In the exemplary program listing to be described below, for example, the entries are pointers to pointers to such objects.) That identifier will represent the task of scanning the further object for references, relocating the object, performing necessary reference updating, etc.

Of course, other task granularities are possible. A separate entry could be made for each reference in a newly identified reachable object, for example.

As will be discussed further below, a garbage-collection thread performs the tasks in its work queue until that queue is empty, and it then searches other threads' queues for tasks to steal and perform, as will also be explained in more detail. The basic technique of employing dynamic-work-stealing queues is described in a paper by Nimar S. Arora et al., entitled "Thread Scheduling for Multiprogrammed Multiprocessors," in the 1998 *Proceedings of the Tenth Annual ACM Symposium on Parallel Algorithms and Architectures*. A garbage-collection thread pushes newly found references onto one end of its work queue, which end is arbitrarily referred to as that work queue's bottom. When the thread is ready to perform a task from its queue, it will pop a reference 36 from the bottom of the queue and perform the represented task. When it is out of work, it "steals" work if possible from another thread's queue by popping a task from the other, "top" end of the other thread's queue.

One way of implementing queue control involves use of an index 82a, b, c, or d ("82") pointing to the next entry to be popped from the top of the queue and an index 84a, b, c, or d ("84") pointing to the location where the next entry should be added to the bottom of the queue. For reasons to be explained below, the memory word (referred to as "age" in the code discussed below) that contains the top index also includes a tag 86a, b, c, or d ("86"). The garbage-collection thread associated with the queue increments the bottom index when it pushes a task identifier onto its queue, and it decrements that index when it pops an identifier from it. A stealing thread increments the top index when it pops an identifier from another thread's queue FIG. 7 sets forth simplified sample code for a routine, "popTop," that a stealing thread could use to pop a task from another thread's queue. That routine involves the tag field. To explain that field's purpose, we first consider in detail how the step of popping the queue from the top is performed.

To steal from the top of another thread's work queue, the stealing thread first reads that queue's top index as part of the "age" value, as FIG. 7's third line indicates, to find its top entry's location. The stealing thread then reads the bottom index to make sure that the bottom index is not less than or the same as the top index, i.e., that the queue is not empty. As FIG. 7's fifth and sixth lines indicate, the stealing thread will not pop the top of the queue if the queue is empty.

Otherwise, the stealing thread reads the top-index-identified queue entry, as the seventh line indicates. But the stealing thread does not immediately perform the task that the queue entry identifies. This is because, after it has read the top index, a second stealing thread may pop the top entry after the first stealing thread has read the location to which the top entry points but before it increments the top index to indicate that it has claimed the task. If that happens, the first stealing thread could end up attempting to process an object that the second thread had already processed. So, before it actually performs that task, the stealing thread performs an atomic compare-and-swap operation, as the tenth line indicates, in which it effectively pops the top queue entry by incrementing the top index 82 if that index's value is still the same as the one the stealing thread used to read the top queue entry, i.e., if no other second stealing thread popped the queue in the interim. As the tenth line also indicates, the storing operation is actually performed on the entire age word, i.e., on the entire word that contains both the top index 82 and the tag 84, rather than only on the top field, for reasons that we will turn to below.

If the stealing thread thereby successfully pops the queue, i.e., if the absence of a top-index-value change as determined by the compare-and-swap operation's comparison has enabled that thread to claim the task by incrementing the top index in that atomic operation's resultant swap, then the eleventh line's test will yield a positive result, and the thread proceeds to perform the task whose identifier the popTop routine returns in the routine's twelfth line. If the top index's field has changed, on the other hand, then another thread has presumably already popped the queue entry. As the thirteenth line indicates, the routine returns a NULL value in that case, and the first stealing thread concludes from the NULL return value that it has not popped the top entry successfully. In short, an interim change in the top index causes the routine not to increment the top index (as part of the compare-and-swap operation) and, because of the NULL return value, prevents the executing thread from performing the task that the initially read queue entry represents.

Thus employing an atomic compare-and-swap operation protects the pop operation's integrity from interference by other stealing threads. Without the tag field, though, the top-popping operation would still be vulnerable to interference from the (bottom-popping) owner thread. To understand why, first consider how the owner thread pushes queue entries.

Unlike stealing threads, the owner thread pushes and pops entries from the bottom of the queue. As the simplified sample code of FIG. 8 illustrates, pushing a queue entry is simply a matter of reading the bottom index ("bot"), writing an entry identifier of a work task ("task") into the location that the bottom entry identifies, and incrementing the bottom index. Since the owner thread is the only thread that pushes onto the queue, and, as FIG. 7's fifth and sixth lines indicate, a stealing thread will not pop an entry from the queue position identified by the bottom index, there is no need to take special precautions against interference by other, stealing garbage-collection threads.

Figures 9, 10:
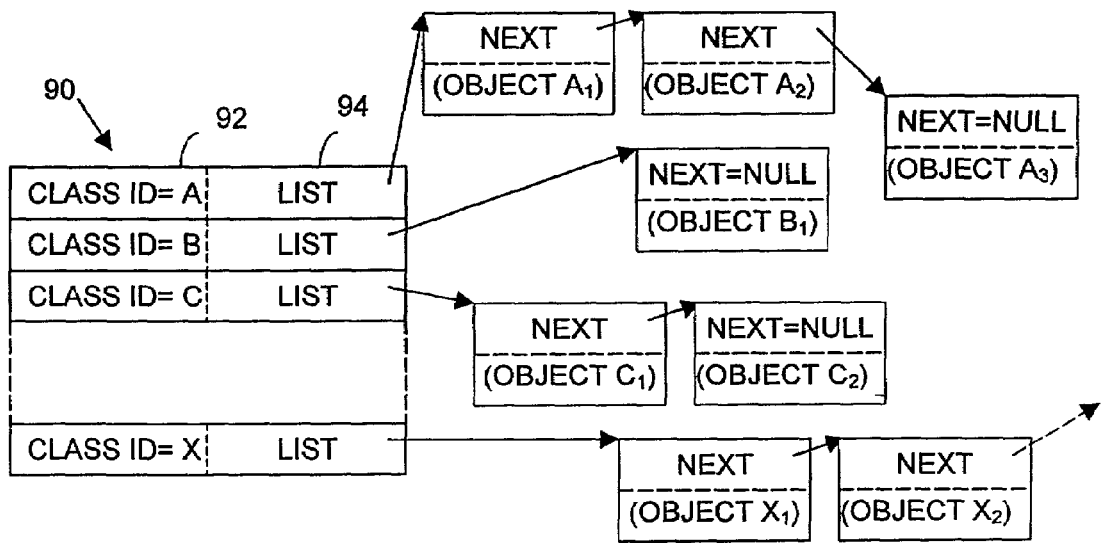
FIG. 9 is a listing of a routine for popping items from the bottom of a double-ending queue.
FIG. 10 is a block diagram of data structures employed by some embodiments of the present invention to implement overflow lists.

But the owner thread's popping an entry from the bottom of the queue does require such precautions. Although a stealing thread pops the top only, the top and the bottom entries are the same when there is only one entry left. FIG. 9 sets forth a simplified example bottom-popping routine, popBottom, that illustrates this.

The popBottom routine starts by determining whether to decrement the bottom index. When the queue is in its initial, unpopulated state, the bottom index has an initial value, call it zero, that represents the start of the space allocated to queue entries. If the bottom index's value is zero, the queue contains no task entries, so no task will be popped, and the bottom index should not be changed. As FIG. 9's third through fifth lines indicate, a zero value of the bottom index therefore causes the routine simply to return a NULL value, and thereby indicate that the queue is empty, without decrementing the bottom index. The owner thread responds to this empty-queue-indicating NULL return value by attempting to find work elsewhere.

If the bottom index has any value other than zero, the popBottom routine performs the sixth- and seventh-line steps of decrementing it to indicate that the bottom has moved up, and it then reads the bottom entry, as the eighth line indicates. Unlike the top-index incrementation that a stealing thread performs in the step represented by FIG. 7's tenth line, though, this index change does not mean that the index-changing thread will necessarily perform the task thereby "claimed." True, that decrementation of the bottom index does prevent the task whose identifier the owner thread reads in FIG. 9's eighth line from being popped by stealing thread—if that stealing thread has not reached the step that FIG. 7's fourth line represents. But a stealing thread that has already passed that step may pop that task.

The bottom-popping routine therefore checks for this possibility. As FIG. 9's ninth and tenth lines indicate, the first thing the bottom-popping routine does for this purpose is to compare the (now-decremented) bottom index, which identifies the queue location from which it read the entry, with the top, next-steal-location-indicating index as it stood after bottom index was decremented. If the bottom index exceeds the top index, no such interim stealing will occur, so the popBottom returns the task identifier to the owner thread's calling routine, and the owner thread proceeds with the task thus identified.

If the bottom index does not exceed the top index, on the other hand, then the task may or may not have been stolen. One thing is certain, though: its identifier was the last one in the queue, and either the current execution of the bottom popping routine will pop that last task or a stealing thread has done so already. So the bottom-popping routine takes the opportunity to set the bottom index to zero and thereby reverse queue contents' downward progression, as FIG. 9's twelfth line indicates.

In the remaining lines of that routine, it also sets the top index to zero. As the thirteenth and fourteenth lines indicate, it prepares to do so by forming a word, newAge, whose top field is zero and, for reasons shortly to be explained, whose tag field is one greater than the tag field read as part of the queue's age value in the ninth-line step. The precise way in which it completes the act of setting the top index to zero depends on whether a steal occurred.

Now, the routine can be sure at this point that a stealing thread has indeed popped that last entry if the originally read top and decremented bottom indexes are not equal, so it tests their equality in the step that the fifteenth line represents. If they are not equal, then the queue location identified as next to be stolen from has advanced beyond the one from which the bottom-popping routine read the task identifier it its eighth line: a stealing thread has already popped that task identified by that task identifier. The routine therefore skips the block represented by the sixteenth through nineteenth lines, it completes the action of zeroing the top index by performing the twentieth line's step of setting the queue's age value to newAge, and, as the twenty-first line indicates, it returns a NULL value to its caller. The NULL value tells the owner thread that no work is left in the queue, so it does not attempt to perform the task identified by the entry that popBottom read in its eighth-line step.

If the result of the fifteenth-line test is positive, on the other hand, then popBottom can conclude that the identified task had not yet been stolen when it read the task identifier from the queue in its eighth-line step. But that task may have stolen in the interim, and there is as yet nothing that will prevent it from being stolen in the future, because the top index has not yet been reset to zero. To reset it—and know whether the target task was stolen before the reset occurred—the routine performs the sixteenth line's atomic compare-and-swap operation. That operation swaps the contents of queue's (top-index-containing) age word with those of newAge, which have a top-field value of zero, if and only if a comparison performed before and atomically with the swap indicates that the age word has not changed since it was read. The swap therefore occurs successfully only if, up until the swap occurred, the queue's top index still indicated that the location from which the routine read the task identifier was yet to be stolen from.

As the seventeenth line indicates, the routine then determines whether the (top-index-resetting) swap was successful. If it was, then no steal occurred, and, in view of FIG. 7's tenth line, none will. So it returns the identity of a task, which the owner thread will accordingly perform. If the swap was unsuccessful, then the top index has not been reset, and another thread must have stolen the task. So the routine resets the top index, as the twentieth line indicates, and returns a NULL value to indicate that it found the queue empty.

We now turn to the reason for the tag field. Consider a situation in which an owner has pushed only single task onto its queue after having just emptied that queue and therefore set its indexes to zero. Now assume that another thread begins an attempt to steal that task. Further assume that the owner thread does two things after the stealing thread has performed FIG. 7's third-, fourth-, and seventh-line steps of reading the indexes and task identifier but before it reaches the tenth-line step of atomically claiming the task by incrementing the top index if that index has not changed since it was read in the third-line step. Specifically, assume that during that time the owner both (1) pops the task whose identifier the stealing thread read and (2) pushes a new task onto the queue to replace it.

The result is that, when the stealing thread's top-popping routine reaches the comparison part of its tenth-line compare-and-swap operation, the top-index value will have returned to the value it had when the top-popping routine read it in its third-line step. So, if the queue's age field were simply the top index, without the additional, tag field, the compare-and-swap operation would succeed, and the stealing thread would perform the task whose identifier the top-popping operation read, even though the owner thread had already claimed that task. By advancing the top index, moreover, the stealing thread would prevent the task that it should have claimed from being thereafter claimed by that thread or any other one. And these results would follow not only in that single-entry situation but also in any situation in which the queue gets emptied if other threads additionally steal enough tasks to return the top index to its previous value.

As FIG. 9's thirteenth and fourteenth lines indicate, though, the owner thread prevents this by not only resetting the top-index field but also incrementing the tag field. So, when the stealing thread performs the comparison part of the top-popping routine's compare-and-swap operation represented by FIG. 7's tenth line, it detects the interfering activity because the age value's tag field has changed, so the stealing thread does not perform the already-claimed task.

The foregoing example code was simplified in, among other things, that it assumes an unlimited queue size. In some implementations, the queue size may be limited and subject to overflow. So, before a thread in the illustrated embodiment pushes a task identifier onto its work queue, it determines whether pushing another object identifier onto its queue would cause it to overflow. If so, the thread first employs an appropriate locking mechanism to obtain temporary exclusive access to a common overflow data structure, FIG. 10's structure 90. With the common overflow data structure thus "locked," the thread moves identifiers one at a time from the bottom of its queue to an overflow list to which, as will be explained presently, that structure points. Preferably, the thread removes half of the identifiers from its queue and leaves the other half there.

The overflow data structure is a table in which each entry includes a class identifier 92 and a list pointer 94, which points to corresponding linked list of objects representing tasks in the overflow list. To add a task-representing object to the overflow list, the thread determines the object's class by reading the class pointer that most object-oriented languages place in object data structures' headers. If the overflow data structure already contains an entry that represents that object's class, the thread adds the task at the head of the corresponding list. It does so by placing the list-field contents of the class's overflow-data-structure entry into the object's erstwhile class-pointer field (labeled "next" in the drawing to represent its new role as a pointer to the next list element) and placing in that list field a pointer to the added point. (The overflow objects are listed by class so that during retrieval the proper class pointer can be re-installed in each object's header.)

If the overflow data structure 90 does not already contain an entry that represents the object's class, the thread adds such an entry to that structure and places the task-representing object at the head of the associated list by making the added entry's list pointer point to that object. The thread also NULLs the erstwhile class-pointer field in the object's header to indicate that it is the last member of its class's linked list of overflowed tasks.

When a thread has exhausted its queue, it determines whether the overflow data structure has any objects in its lists. If not, it attempts to steal from other threads' work queues. Otherwise, the thread obtains a lock on the overflow data structure and retrieves one or more objects from one or more of its lists. In doing so, the thread restores each retrieved object's class pointer and re-links remaining objects as necessary to maintain the overflow lists. The retrieved objects are pushed onto the bottom of the queue. Although the number of objects retrieved as a result of a single queue exhaustion is not critical, it is advantageous for a thread to retrieve enough to fill half of its queue space. Then, if its queue subsequently overflows and it removes half from its queue as suggested above, the retrieved objects will be in the top half of the queue, so those retrieved objects will not be placed again on an overflow list.

Although FIG. 10 depicts the overflow data structure 90 as a compact table, the overflow data structure may be provided efficiently by storing a pointer to a class's list of overflow objects directly in the class data structure and maintaining the set of classes where overflow lists are non-empty as a linked list of class data structures threaded through a class-data-structure field provided for that purpose. For the sake of convenience, we will assume this organization in the discussion of the present invention's approach to termination detection, to which we now turn.

When an owner thread's execution of FIG. 9's bottom-popping routine produces a NULL return value, indicating that it has exhausted its own work queue, the thread attempts to find tasks identified by other sources. And it continues doing so until it either (1) thereby finds a further operation-C task to perform or (2) concludes, in accordance with the present invention, that no more such tasks remain. In the example scenario, it can then move on to operation D.

FIG. 11 sets forth in simplified code an example of how a thread can search for further work and determine whether any more exists. As will be explained presently in more detail, an executing thread that has exhausted its own work queue in the illustrated embodiment calls FIG. 11's dequeFindWork routine, passing that routine a pointer to the work queue of which it is the owner. If dequeFindWork returns a NULL value, the executing thread concludes that no further operation-C tasks remain, and it presses on to operation D. If dequeFindWork returns a non-NULL task identifier, on the other hand, the executing thread performs the task thereby identified. The executing thread may push further tasks onto its work queue in the course of performing that task, and, as will be explained below, dequeFindWork may have pushed task identifiers onto the executing thread's work queue in the course of finding the task identifier that it returns. So the executing thread returns to bottom-popping task identifiers from its own work queue after it has performed the task whose identifier dequeFindWork returns.

In FIG. 11, dequeFindWork's second line shows that its first step is to call a helper routine, findWorkHelper, which FIG. 11 also lists. This routine is what attempts to find tasks identified in locations other than the executing thread's work queue. Since the illustrated embodiment limits its work-queue memory space and uses overflow lists as a result, the helper routine looks for task identifiers in any overflow lists. The subroutine call in findWorkHelper's second line represents this search. If the overflow-list-retrieval routine (whose code the drawings omit) is successful in retrieving task identifiers, its return value, as well as those of the helper routine and of dequeFindWork itself, is one of them.

If the overflow-list-retrieval routine is unsuccessful, it returns a NULL value. As the helper routine's third and fourth lines indicate, the helper routine responds to such a NULL return value by trying to steal a task from another thread's work queue. Now, perusal of FIG. 7's top-popping routine reveals that the illustrated embodiment permits interference from other threads to cause a steal attempt to fail even if the queue contains plenty of task identifiers. To minimize the likelihood that any such interference will occur systematically, the work-stealing routine that Fig. 1's helper routine calls in its fourth line may use the probabilistic approach to stealing that FIG. 12 sets forth.

The stealWork routine that FIG. 12 lists assumes a common data structure of which FIG. 6's structure 96 shows a few fields of interest. The work-queue data structures are assumed to include pointers 98 to this common data structure, which FIG. 12's second line refers to as being of the "globalDeques" data type. Among that structure's fields is a field 100 that tells how many individual-thread work queues there are, and, as the stealWork routine's third and fourth lines indicate, it sets a loop-iteration limit to, in this example, twice that number.

As will now be explained in connection with the steal-Work routine's fifth through thirteenth lines, that routine either succeeds in stealing from another work queue or gives up after making a number of attempts equal to the loop-iteration limit. On each attempt, it makes its seventh-line call to a subroutine (whose code the drawings omit) that randomly chooses a queue other than the one associated with the executing thread, and it tries to steal a task from that queue, as its eighth and ninth lines indicate. If the top-popping routine called in the ninth line fails, the illustrated embodiment also makes the tenth line's system call to terminate the thread's current execution time slice in favor of any threads that are waiting for processor time.

If the number of repetitions of the loop of FIG. 12's sixth through thirteenth lines reaches the loop-repetition limit without successfully stealing a task, the stealWork routine returns a NULL value, as its fourteenth line indicates, and so does FIG. 11's findWorkHelper routine, as its fourth and sixth lines indicate.

Now, a review of, for instance, FIG. 12's stealWork routine reveals that in the illustrated embodiment a thread can "give up" on seeking work in other threads' work queues—and its execution of that routine therefore produce a NULL return value—even in some situations in which one or more of the other queues do contain remaining task identifiers. Allowing the thread to go on to the next operation when it has thus failed to find other work could result in a serious work imbalance.

Indeed, such an imbalance could result even if the operation instead used a work-stealing routine that would not give up until all queues are empty. Suppose, for example, that a thread moves on to the next operation because all work queues are empty, but when it does so one or more other threads are still processing respective tasks. Since the operation that it is leaving is one that identifies tasks dynamically, there could actually be a large number of (as yet unidentified) tasks yet to be performed. The thread that failed to find work in the other threads' queues (and, in the illustrated example, in the overflow lists) would then be leaving much of that operation's tasks to the other threads rather than optimally sharing those tasks.

To prevent this, the present invention employs FIG. 6's status word 102. This word includes a separate (typically, single-bit) field corresponding to each of the threads. The steps represented by FIG. 5's block 62 include initializing that word's contents by setting all of those fields to a (say, binary-one) value that represents what we will call an active thread state. When FIG. 12's stealWork routine fails to steal work and as a result causes a NULL return value from the FIG. 11 dequeFindWork routine's second-line call of the findWorkHelper routine, dequeFindWork makes its fifth-line call of a routine that changes status word 102's value. That fifth-line subroutine atomically resets the executing thread's field in that word to an inactivity-indicating value of, say, a binary zero. (We use the term word in "status word" because the status word in almost every implementation be of a size that can be accessed in a single machine instruction. This is not an essential part of the invention, but the field resetting does have to be performed in such a way as not to affect other fields, and it has to be possible to read the status "word" in an atomic fashion.)

The dequeFindWork routine then enters a loop that its seventh through nineteenth lines set forth. This loop repeatedly looks for further work, in a way that will be explained shortly. When it finds work, it leaves the loop, as the seventh line indicates, with the result that the dequeFindWork routine returns the thereby-found task's identifier. So, if the loop finds work, the executing thread performs the task and returns to attempting to pop task identifiers from its own queue until it again exhausts that queue and returns to dequeFindWork to find work again in other locations. In the illustrated scenario, that is, the thread continues to work on FIG. 5's operation C.

According to the present invention, the only way in which the thread can leave that operation is for every field of FIG. 6's status word 102 to contain the inactivity-indicating value, i.e., for the illustrated embodiment's status word to contain all zeroes. As was just explained, no thread can set its status field to indicate inactivity while its queue has work. Moreover, a queue places work in the overflow lists only when it has work in its queue, and, when it exhausts its queue, it checks the overflow lists before it marks itself inactive. So no thread can leave the operation unless all of its tasks have been completed.

If the status word does not indicate that all work has been completed, the dequeFindWork routine checks for work. Some embodiments may reduce the loop frequency by, as the illustrated embodiment illustrates in its ninth-line step, first allowing any threads waiting for execution time to be accorded some. In any event, it then checks for further work by calling a checkForWork routine, as its tenth line indicates.

FIG. 13 sets forth the checkForWork routine. As that routine's third line indicates, it determines whether there is a non-NULL value in FIG. 6's common classesWithWork field 104, which is the pointer to the linked list of class structures whose overflow lists contain at least one task identifier each. If there are no task identifiers in overflow lists, the classesWithWork field contains a NULL value.

If the classesWithWork field does contain a NULL value, that third-line step also calls a peekDeque routine. As FIG. 13 shows, the peekDeque routine repeatedly chooses other threads' queues at random, just as FIG. 12's stealWork routine does. Instead of claiming any work thereby found, though, it merely returns a Boolean value that indicates whether it found work in the other queues. So the return value produced by the checkForWork routine's third-line step indicates whether work was either in the overflow lists or in the other threads' work queues, and this is the value that is returned to FIG. 11's dequeFindWork routine in that routine's the tenth line.

But the dequeFindWork routine does not claim the thereby-discovered task for the executing queue, at least not immediately. If it did claim a task while its field in FIG. 6's common status word 102 contained an inactivity-containing value, other threads would neither find that task nor, if they could find no other work, be prevented by an activity-indicating field from leaving operation C. So, as dequeFind-Work's thirteenth and fourteen lines indicate, that routine sets the executing thread's status-word field to the active state. Only after doing so does it call the findWorkHelper routine and thereby possibly claiming a remaining task for that thread. (Note that any task thereby claimed will not necessarily be the same as the task whose discovery caused the thread to set its status-word field.) As the fifteenth and sixteen lines indicate, it marks itself inactive again if the findWorkHelper nonetheless fails to claim a task, and the loop beginning on the seventh line begins again. Otherwise, the dequeFindWork routine returns the identifier of the claimed task, which the executing thread accordingly performs.

In this way, all threads keep working on operation C so long as any of its tasks remain to be done. The present invention thus provides an efficient way of ensuring that a parallel-execution operation's tasks are well divided among the threads assigned to the operation, even if that operation identifies its tasks dynamically. The present invention thus constitutes a significant advance in the art.

What is claimed is:

1. A computer system that employs a plurality of threads of execution to perform a parallel-execution operation in which the threads identify tasks dynamically and in which the computer system comprises:
    A) a mechanism that associates a separate status-word field with each of the threads; and
    B) a mechanism that operates the threads in a manner that each thread:
        i) executes a task-finding routine to find tasks previously identified dynamically and performs tasks thereby found, with its associated status-word field containing a value indicating it is active, until the task-finding routine finds no more tasks;
        ii) when the task-finding routine executed in step (i) finds no more tasks, sets the contents of its associated status-word field to a value indicating it is inactive;
        iii) after completing step (ii) and while the status-word field associated with any other thread contains a value indicating that the other thread is active, continues to search for a task using the task-finding routine, and, if it finds one, sets its associated status-word field contents to a value indicating that it is active before attempting to execute a found task; and
        iv) during step (iii) when none of the status-word fields associated with other threads contains a value indicating that an associated thread is active and no task has been found, terminates its performance of the parallel-execution operation.

2. A computer system as defined in claim 1 wherein the parallel-execution operation is a garbage-collection operation.

3. A computer system as defined in claim 1 wherein:
    A) each thread has associated with it a respective work queue in which it places task identifiers of tasks that thread identifies dynamically;
    B) the task-finding routine executed by that thread includes performing an initial search for a task identifiers in the work queue associated with that thread and, if that work queue contains no task identifiers that thread can claim thereafter performing a further search for a task identifier in at least one other task-storage location.

4. A computer system as defined in claim 3 wherein the parallel-execution operation is a garbage-collection operation.

5. A computer system as defined in claim 3 wherein the at least one other task-storage location includes at least one work queue associated with a thread other than the executing thread.

6. A computer system as defined in claim 5 wherein:
A) there is a size limit associated with each work queue;
B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and
C) the at least one other task-storage location includes at least one such over flow list.

7. A computer system as defined in claim 5 wherein the task-finding routine includes selecting in a random manner the at least one work queue associated with a thread other than the executing thread.

8. A computer system as defined in claim 5 wherein the further search includes repeatedly searching a work queue associated with a thread other than the executing thread until the executing thread thereby finds a task or has performed a number of repetitions equal to a repetition limit greater than one.

9. A computer system as defined in claim 8 wherein the task-finding routine includes selecting in a random manner the at least one work queue associated with a thread other than the executing thread.

10. A computer system as defined in claim 3 wherein:
A) there is a size limit associated with each work queue;
B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and
C) the at least one other task-storage location includes at least one such over flow list.

11. A computer system as defined in claim 1 wherein the contents of all of the status-word fields fit in a memory location accessible in a single machine instruction.

12. A computer system as defined in claim 11 wherein the parallel-execution operation is a garbage-collection operation.

13. A computer system as defined in claim 11 wherein each status-word field is a single-bit field.

14. A computer system as defined in claim 13 wherein each single-bit field contains a logic one to indicate that the associated thread is active and contains a logic zero to indicate that the associated thread is inactive.

15. For employing a plurality of threads of execution to perform a parallel-execution operation in which the threads identify tasks dynamically, a computer-implemented method comprising:
A) associating a separate status-word field with each of the threads; and
B) operating the threads in a manner that each thread:
i) executes a task-finding routine to find tasks previously identified dynamically and performs tasks thereby found, with its associated status-word field containing a value indicating it is active, until the task-finding routine finds no more tasks;
ii) when the task-finding routine executed in step (i) finds no more tasks, sets the contents of its associated status-word field to a value indicating it is inactive;
iii) after completing step (ii) and while the status-word field associated with any other thread contains a value indicating that the other thread is active, continues to search for a task using the task-finding routine, and, if it finds one, sets its associated status-word field contents to a value indicating that it is active before attempting to execute a found task; and
iv) during step (iii) when none of the status-word fields associated with other threads contains a value indicating that an associated thread is active and no task has been found, terminates its performance of the parallel-execution operation.

16. A method as defined in claim 15 wherein the parallel-execution operation is a garbage-collection operation.

17. A method as defined in claim 15 wherein:
A) each thread has associated with it a respective work queue in which it places task identifiers of tasks that thread identifies dynamically;
B) the task-finding routine executed by that thread includes performing an initial search for a task identifiers in the work queue associated with that thread and, if that work queue contains no task identifiers that thread can claim, thereafter performing a further search for a task identifier in at least one other task-storage location.

18. A method as defined in claim 17 wherein the parallel-execution operation is a garbage-collection operation.

19. A method as defined in claim 17 wherein the at least one other task-storage location includes at least one work queue associated with a thread other than the executing thread.

20. A method as defined in claim 19 wherein:
A) there is a size limit associated with each work queue;
B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and
C) the at least one other task-storage location includes at least one such over-flow list.

21. A method as defined in claim 19 wherein the task-finding routine includes selecting in a random manner the at least one work queue associated with a thread other than the executing thread.

22. A method as defined in claim 19 wherein the further search includes repeatedly searching a work queue associated with a thread other than the executing thread until the executing thread thereby finds a task or has performed a number of repetitions equal to a repetition limit greater than one.

23. A method as defined in claim 22 wherein the task-finding routine includes selecting in a random manner the at least one work queue associated with a thread other than the executing thread.

24. A method as defined in claim 17 wherein:
A) there is a size limit associated with each work queue;
B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and C) the at least one other task-storage location includes at least one such over-flow list.

25. A method as defined in claim 15 wherein the contents of all of the status-word fields fit in a memory location accessible in a single machine instruction.

26. A method as defined in claim 25 wherein the parallel-execution operation is a garbage-collection operation.

27. A method as defined in claim 25 wherein each status-word field is a single-bit field.

28. A method as defined in claim 27 wherein each single-bit field contains a logic one to indicate that the associated thread is active and contains a logic zero to indicate that the associated thread is inactive.

29. A storage medium containing instructions readable by a computer system to configure the computer system to employ a plurality of threads of execution to perform a parallel-execution operation in which the threads identify tasks dynamically and in which the computer system comprises:

A) a mechanism that associates a separate status-word field with each of the threads; and B) a mechanism that operates the threads in a manner that each thread:
  i) executes a task-finding routine to find tasks previously identified dynamically and performs tasks thereby found, with its associated status-word field containing a value indicating it is active, until the task-finding routine finds no more tasks;
  ii) when the task-finding routine executed in step (i) finds no more tasks, sets the contents of its associated status-word field to a value indicating it is inactive;
  iii) after completing step (ii) and while the status-word field associated with any other thread contains a value indicating that the other thread is active, continues to search for a task using the task finding routine, and, if it finds one, sets its associated status-word field contents to a value indicating that it is active before attempting to execute a found task; and
  iv) if none of the status-word fields associated with other threads contains a value indicating that an associated thread is active, terminates its performance of the parallel-execution operation.

30. A storage medium as defined in claim 29 wherein the parallel-execution operation is a garbage-collection operation.

31. A storage medium as defined in claim 29 wherein:

A) each thread has associated with it a respective work queue in which it places task identifiers of tasks that thread identifies dynamically;

B) the task-finding routine executed by that thread includes performing an initial search for a task identifiers in the work queue associated with that thread and, if that work queue contains no task identifiers that thread can claim, thereafter performing a further search for a task identifier in at least one other task-storage location.

32. A storage medium as defined in claim 31 wherein the parallel-execution execution operation is a garbage-collection operation.

33. A storage medium as defined in claim 31 wherein the at least one other task-storage location includes at least one work queue associated with a thread other than the executing thread.

34. A storage medium as defined in claim 33 wherein:

A) there is a size limit associated with each work queue;

B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and C) the at least one other task-storage location includes at least one such over flow list.

35. A storage medium as defined in claim 33 wherein the task-finding routine includes selecting in a random manner the at least one work queue associated with a thread other than the executing thread.

36. A storage medium as defined in claim 33 wherein the further search includes repeatedly searching a work queue associated with a thread other than the executing thread until the executing thread thereby finds a task or has performed a number of repetitions equal to a repetition limit greater than one.

37. A storage medium as defined in claim 36 wherein the task-finding routine includes selecting in a random manner the at least one work queue associated with a thread other than the executing thread.

38. A storage medium as defined in claim 31 wherein:

A) there is a size limit associated with each work queue;

B) when a given thread dynamically identifies a given task that would cause the number of task entries in the work queue associated with the given thread to exceed the size limit if a task identifier that identifies it were placed in that work queue, the given thread instead places that task identifier in an overflow list instead of in that work queue; and C) the at least one other task-storage location includes at least one such over flow list.

39. A storage medium as defined in claim 29 wherein the contents of all of the status-word fields fit in a memory location accessible in a single machine instruction.

40. A storage medium as defined in claim 39 wherein the parallel-execution operation is a garbage-collection operation.

41. A storage medium as defined in claim 39 wherein each status-word field is a single-bit field.

42. A storage medium as defined in claim 41 wherein each single-bit field contains a logic one to indicate that the associated thread is active and contains a logic zero to indicate that the associated thread is inactive.

43. A computer system that employs a plurality of threads of execution to perform a parallel-execution operation in which the threads identify tasks dynamically, the computer system including:

A) means for associating a separate status-word field with each of the threads; and B) means for operating the threads in a manner that each thread:
  i) executes a task-finding routine to find tasks previously identified dynamically and performs tasks thereby found, with its associated status-word field containing a value indicating it is active, until the task-finding routine finds no more tasks;
  ii) when the task-finding routine executed in step (i) finds no more tasks, sets the contents of its associated status-word field to a value indicating it is inactive
  iii) after completing step (ii) and while the status-word field associated with any other thread contains a value indicating that the other thread is active, continues to search for a task using the task-finding routine, and, if it finds one, sets the status-word field contents to the activity-indicating a value indicating that it is active before attempting to execute a found task; and iv) during step (iii) when none of the status-word fields associated with other threads contains a value indicating that an associated thread is active and no task has been found, termiates its performance of the parallel-execution operation.

* * * * *